P. T. Smith,
Planing and Sawing Machine.

No. 65,128.          Patented May 28, 1867.

Witnesses:
J. H. Burridge
Frank Alden

Inventor:
P. T. Smith

United States Patent Office.

P. T. SMITH, OF SALEM, OHIO.

Letters Patent No. 65,128, dated May 28, 1867.

---

IMPROVEMENT IN PLANING MACHINES FOR WOOD.

---

The Schedule referred to in these Letters Patent and making part of the same.

---

TO ALL WHOM IT MAY CONCERN:

Be it known that I, P. T. SMITH, of Salem, in the county of Columbiana, and State of Ohio, have invented certain new and useful Improvements in Planing and Re-sawing Machines; and I do hereby declare that the following is a full and complete description of the construction and operation of the same, reference being had to the accompanying drawings, making a part of this specification, in which—

Figure 6:
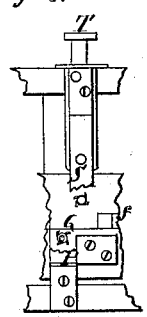

Figure 6, a detached section.

Like letters of reference refer to like parts in the several views.

Figure 1:
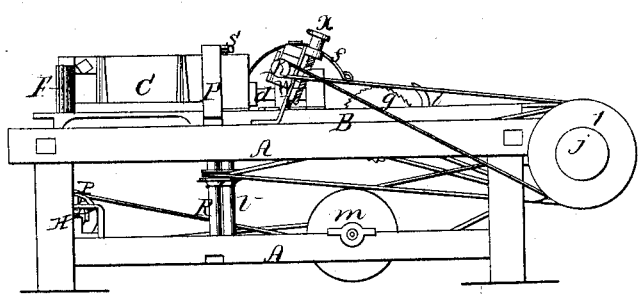
Figure 1 is a side view of the machine.
Figure 2:
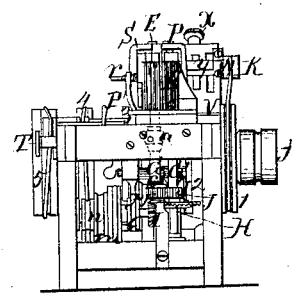
Figure 2 is an end view.
Figure 3:
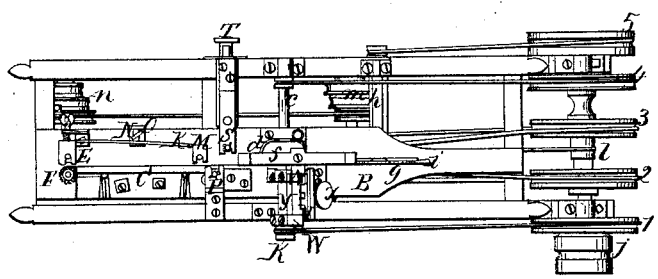
Figure 3 is a top view.
Figure 5:
Figure 5 is a detached section, to which reference will be had.
Figure 4:
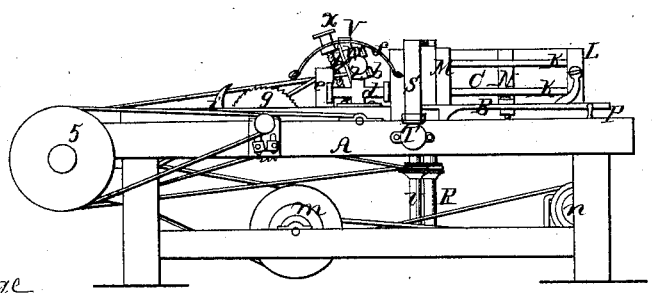
Figure 4 is a view of the opposite side of fig. 1.

A, fig. 1, is the frame of the machine, upon the top of which is secured the bed-plate B. To this plate is bolted the guide or shoulder-piece C. E F, fig. 2, are feed-rollers, secured to the shafts G G', and by which they are made to revolve—G' by the crown-wheel and bevel-pinion H and I, and G by the pinions J. It will be seen that the pinion is not keyed to the shaft G, but is fitted to the same by the means of dowel-points, $c'$, inserted into the wheel, and loosely enough to allow to the shaft a slight lateral movement; and so also is the feed-roller so connected to the shaft G by a socket joint, indicated by the dotted lines $a$, fig. 2, the purpose of which will hereafter be shown. K, fig. 4, are two parallel springs, the outer ends of which are fixed to the stay L, in which the feed-roller E is held, and the inner ends are fixed to the stay M, in which is held a smooth roller, corresponding in position to roller E. The centres of these springs are supported by the angle-iron N, and which is so connected to the bed-plate B as to be adjustable by means of the slot and finger-screw O. P, fig. 1, and of which fig. 5 is a detached view, is a stay, in which is held a head of revolving cutters or blades Q, connected to and driven by the vertical shaft R. S is an adjustable stay, operated by the hand-screw T. Transversely across the frame in this stay is also held a head of revolving cutters, like the one above described, and with which it corresponds in position. This head is connected to and operated by the shaft U. The relative position of the revolving cutters to each other and to the several rollers and guide C is shown in fig. 3. A transverse view of the same is shown in fig. 6. V, fig. 2, is a slotted stay, and in which slots are fitted the journal-boxes W; which may be moved upward or downward by the hand-screw $x$, for a purpose hereafter shown. In the boxes is fitted a shaft, Y, on the inner end of which is secured a head, Z. To this head are fixed the plane-irons $b$, fig. 4. Immediately below this head, on the end of the shaft $c$, is a head corresponding in size and in number of plane-irons to the one referred to, and with which it acts conjointly for the same purpose, as will hereafter be shown. $d$ is a spring-brace; $e$ an angle-iron, which serves as a guide, and against which the spring-brace is exerted when a board is interposed between the two, as will hereafter be described. $f$ is also a spring-brace, which will be referred to hereafter. $g$ is a saw, mounted upon the shaft $h$; and $i$, a spreader.

Having thus described the several parts of the machine, the operation of and application of the power to the saw are as follows: At the rear end of the frame is arranged a gang of pulleys, 1, 2, 3, 4, 5, which is driven by the power used, applied to the pulley $j$. A band running from the pulley 1 to pulley K drives the shaft and planers Z, and a band running from 4 to the shaft $c$ drives the planer immediately below Z. Pulleys 2 and 3 drive the vertical shafts R and U, to which the two sides or vertical planers, held by the stays S and P, are connected. Pulley 5 drives the saw. The small pulley $l$, between the pulleys 2 and 3, drives the transfer shaft and pulleys $m$. $n$ is a cone-pulley, relatively corresponding with the cone on the transfer shaft referred to, and by which the feed-rollers E are driven by the gearing above described. The cone-pulley $n$ is free upon the shaft, and is thrown in and out of gear with the wheels by the clutch O', operated by the lever P'. By this means the feed-rollers may be used in connection with the planers or not, as the nature of the work may determine.

The purpose of this machine is to plane siding and flooring, grooving and tonguing, the latter at one operation or by once passing it through the machine, and which is done in the following manner: Stuff twice the required thickness of a piece of siding and of the proper width is entered between the feed-rollers referred to.

One of these rollers, as above said, is loosely dowelled to the pinion J, and by this means is easily gauged to the thickness of the stuff run through. As it passes between the rollers, the adaptable one is forced against the board or secured at a proper distance by the finger-screw r, and retained from falling against the corresponding roller by the spring K, referred to. As the board is drawn in by the rollers, it is pressed against the shoulder or guide C by the smooth roller in the stay M. As it passes this roller, it enters between the two revolving planes secured in the stays P and S. Both sides of the board are thus planed at the same time on having passed these side planers. The edges of the board are then planed by the edge planers in the head Z, and the corresponding one immediately below. While passing through these two planers the board is kept in position by the spring-braces f and d, f preventing it from any vertical displacement, and d from any lateral. The board, as it now leaves the planers, is dressed on both sides and on both edges. It is now ripped through the centre by the saw g, and thus leaves the machine in two pieces of siding, properly dressed and edged. The shape of the edge of the boards may be varied by simply changing the form of the plane-irons. In dressing flooring by this machine, one of the vertical planes only is used, as one side of the board only is to be planed. The plane-irons in the horizontal or edge planes are changed from plane to tongue-and-groove irons; the board is then run through in the same way as above described, and leaves the machine planed, tongued, and grooved by one operation. Any width or thickness of board may be dressed in this machine, by changing the distances of the feed-rollers and regulating the several braces referred to, which, as aforesaid, are all adjustable.

The advantage of this machine is the planing of two pieces of siding at once, thereby saving the time and labor of running separate pieces through for the purpose of dressing them. The construction of the machine is such that the work is rapidly and smoothly done. It is also convenient and easily adjusted to all width and thickness of stuff, and can be used in this particular work of dressing siding singly or doubly in the manner as above described, as it can be run either with or without the saw. For dressing flooring it is equal to any machine in use, as the work is smoothly, truly, and rapidly done.

What I claim as my improvement, and desire to secure by Letters Patent, is—

1. The adaptable shaft G, dowel points or clutch c', socket-joint a, in combination with the feed-rollers E F, and springs K, as and for the purpose substantially as set forth.

2. The vertical revolving cutters Q, spring-guides d' and f, as arranged, in combination with the saw g, for the purpose and in the manner described.

P. T. SMITH.

Witnesses:
C. A. NOBLE,
H. E. MEYER.